United States Patent
Myren et al.

(10) Patent No.: US 10,108,400 B1
(45) Date of Patent: Oct. 23, 2018

(54) RAPID AVIONICS DEVELOPMENT ENVIRONMENT

(71) Applicant: Rockwell Collins, Inc., Cedar Rapids, IA (US)

(72) Inventors: Jason A. Myren, Marion, IA (US); David W. Hubin, Cedar Rapids, IA (US); Joshua R. Bertram, Cedar Rapids, IA (US); Matthew A. Griess, Richardson, TX (US); Levi D. Van Oort, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 67 days.

(21) Appl. No.: 14/590,722

(22) Filed: Jan. 6, 2015

(51) Int. Cl.
| G06F 9/44 | (2018.01) |
| G06F 8/34 | (2018.01) |
| G06F 13/42 | (2006.01) |
| G06F 11/34 | (2006.01) |

(52) U.S. Cl.
CPC ............ *G06F 8/34* (2013.01); *G06F 11/3419* (2013.01); *G06F 13/4221* (2013.01); *G06F 2201/865* (2013.01)

(58) Field of Classification Search
CPC .............................. G06F 8/34; G06F 13/4221
See application file for complete search history.

(56) References Cited

U.S. PATENT DOCUMENTS

| 9,229,920 B1* | 1/2016 | Fiedler | G06F 17/24 |
| 2011/0191747 A1* | 8/2011 | Charisius | G06F 8/20 |
| | | | 717/103 |
| 2012/0005679 A1* | 1/2012 | Shin | G06F 11/3466 |
| | | | 718/100 |
| 2012/0030647 A1* | 2/2012 | Wang | G06F 8/34 |
| | | | 717/105 |
| 2013/0290749 A1* | 10/2013 | Broekaert | G06F 1/3203 |
| | | | 713/300 |
| 2014/0215439 A1* | 7/2014 | Krishnan | G06F 11/3664 |
| | | | 717/124 |
| 2015/0220311 A1* | 8/2015 | Salter | G06F 17/5009 |
| | | | 717/105 |
| 2016/0182563 A1* | 6/2016 | Sambandam | H04L 63/1466 |
| | | | 726/22 |

OTHER PUBLICATIONS

Schoofs et al., "An Integrated Modular Avionics Development Environment", IEEE/AIAA 28th Digital Avionics Systems Conference, Oct. 23-29, 2009, pp. 1.A.2-1 through 1.A.2-9.*
VanderLeest et al., "ARINC 653 Hypervisor", 2010 IEEE/AIAA 29th Digital Avionics Systems Conference (DASC), Oct. 3-7, 2010, Salt Lake City, UT, pp. 5.E.2-1 through 5.E.2-20.*

* cited by examiner

*Primary Examiner* — S. Sough
*Assistant Examiner* — Timothy P Duncan
(74) *Attorney, Agent, or Firm* — Angel N. Gerdzhikov; Donna P. Suchy; Daniel M. Barbieri

(57) ABSTRACT

An avionics development environment based on high level interpreted language for rapid creation and deployment of avionics software is disclosed. Functional modules are segregated in time and allocated segregated resources so that functional modules only interact in predictable, deterministic ways. Segregated functional modules are individually certifiable for avionics operation, and parameters necessary for certification are associated with each functional module to ensure the end application conforms to such parameters.

19 Claims, 5 Drawing Sheets

RAPID AVIONICS DEVELOPMENT ENVIRONMENT

FIELD OF THE INVENTION

The present invention is directed generally toward software development and more particularly to software development for hardware in avionics applications.

BACKGROUND

Software development for avionics hardware requires substantial knowledge of programming languages and avionics certification requirements. Typically, in avionics environments, the software development cycle is measured in months or years. Developing a working software prototype can take weeks or months.

Further, due to the special nature of avionics safety requirements, the avionics industry has developed a number of avionics-specific standards which are not necessarily focused on ease-of-use for the software developer. Information and tutorials on most of these standards is not readily available.

While much progress has been made in the past decade in terms of model based development and higher-level languages, these tools come with a high license cost, certification burden, and a recurring certification effort to maintain the environments, the runtime environments or libraries, and the software itself.

What is needed is a means for early prototype development along with a mechanism to provide a path to certification in both military and commercial avionics environments.

SUMMARY

Accordingly, embodiments of the inventive concepts disclosed herein are directed to a method and apparatus for prototype development and certification in an avionics environment.

One embodiment of the inventive concepts disclosed herein is directed to a development environment wherein system resources are strictly partitioned to control access by defined functions. Functions are utilized through high level scripting and a scripting engine to interpret the called functions and enforce parameter boundaries defined by avionic certification standards.

The script engine manages typical housekeeping tasks in an avionics application. The software developer only works on key functions, reducing development time. The script engine detects and outputs code coverage metrics that are required in certification It is to be understood that both the foregoing general description and the following detailed description are exemplary and explanatory only and are not restrictive of the invention claimed. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the inventive concepts disclosed herein may be better understood by those skilled in the art by reference to the accompanying figures in which.

DETAILED DESCRIPTION

Reference will now be made in detail to the subject matter disclosed, which is illustrated in the accompanying drawings. The scope of the inventive concepts disclosed herein is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
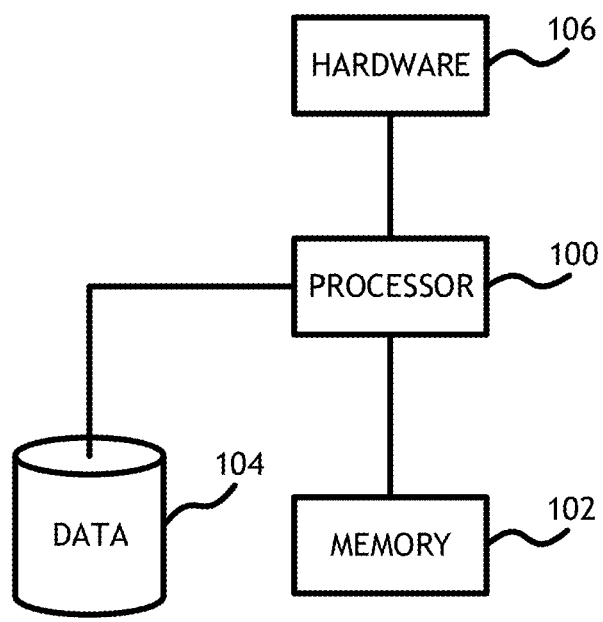
FIG. 1 shows a block diagram of a computer apparatus suitable for implementing embodiments of the inventive concepts disclosed herein.

Referring to FIG. 1, a computer apparatus comprising a processor 100, a memory 102 connected to the processor 100, and a data storage element 104 connected to the processor 100 instantiate a development environment or framework for avionic applications, and specifically for avionics applications for specific avionics hardware 106. In some embodiments of the inventive concepts disclosed herein, a development framework executing on the processor 100 comprises a scripting environment where software applications are constructed through scripting. Scripting allows functionality to be easily plugged into applications. The scripting environment references compiled certification specifications and requirements from the data storage element 104 to ensure that scripts conform to avionics standards and practices during development and at runtime. Certification specifications and requirements include, but are not limited to, acceptable ranges of input and output parameters, acceptable worst case execution time, acceptable error handling, etc. The development framework produces runtime executables to run on target avionics hardware 106 by partitioning scripts into well-defined executable units.

During partitioning, scripts are parsed through an appropriate interpreter to produce executables. In some embodiments, the processor 100 may utilize various configuration methods to convert the scripts to an executable language. For example, an XML based parser may translate script functionality to XML tags for high design level assurance; alternatively, a reverse polish notation parser may translate script functionality where such functionality comprises math formulas and where control flow is not an issue such as in an engine-indication and crew alerting system; furthermore, a scripting language such as Lua may be utilized where formulas and control flow are both important.

Script partitions are executed with well-defined resource allocations to track the execution of each script component. In one embodiment, the development framework allows each script partition to be independently replaced with traditional non-script-based executable code that complies with all standards for obtaining necessary certifications.

Figure 2:
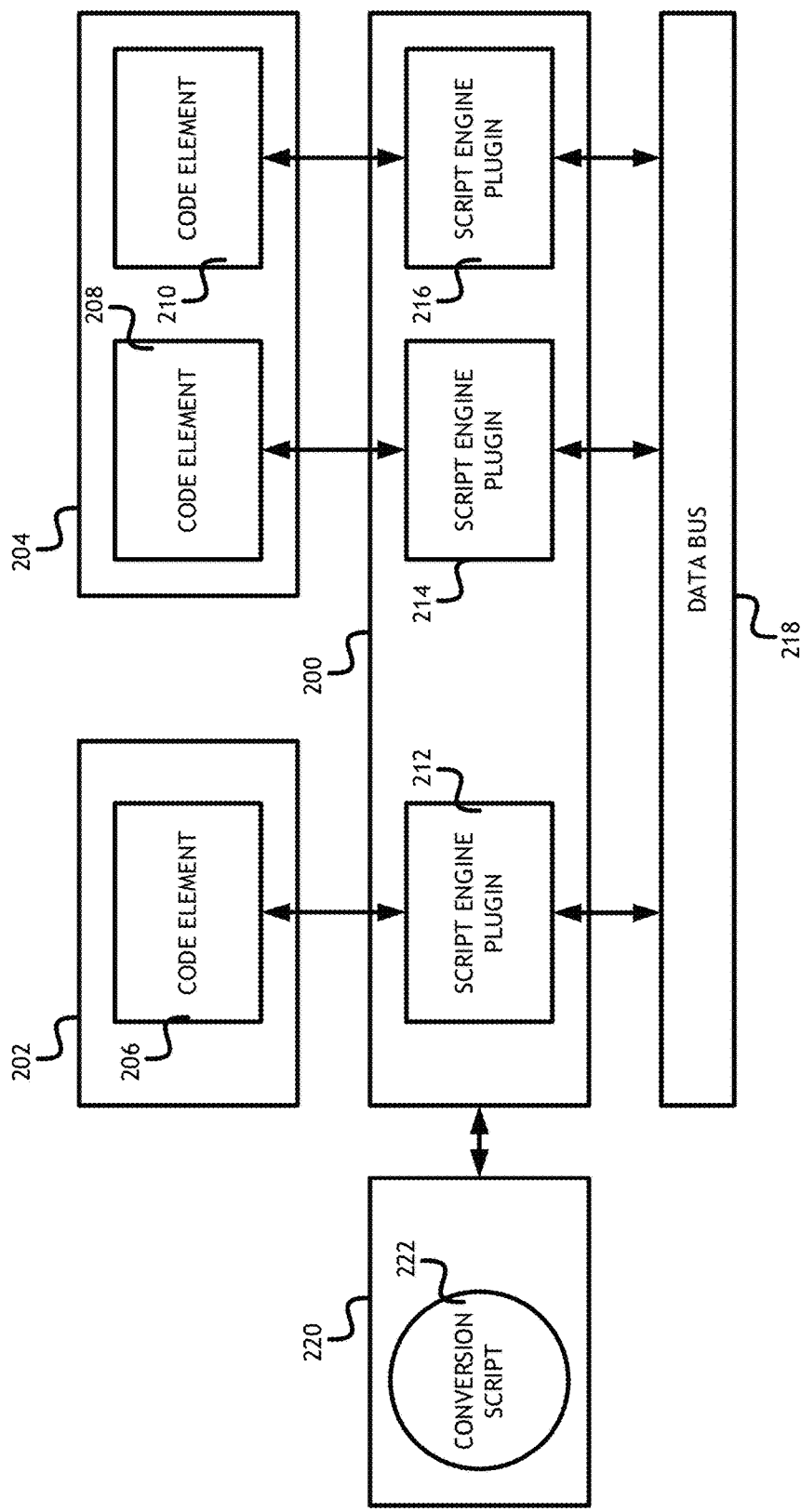
FIG. 2 shows a block diagram of an embedded scripting environment according to one embodiment of the inventive concepts disclosed herein.

Referring to FIG. 2, an embedded scripting environment is shown. A first application 202 contains one or more portable code elements 206, and a second application 204 contains one or more portable code elements 208, 210. Even where all the portable code elements 206, 208, 210 conform to a single data model, the portable code elements 206, 208, 210 may not be compatible with each other. A scripting layer 200 includes a plurality script engine plugins 212, 214, 216, each of which receives output from a portable code element 206, 208, 210 and either allows the output to pass through to a transport layer/data bus 218, or performs some required conversion to the output based on a data conversion script 222 in a scripting engine 220 before sending the output to the transport layer/data bus 218. Likewise, data received from the transport layer/data bus 218, directed toward one of the portable code elements 206, 208, 210 is converted by a script engine plugin 212, 214, 216 according to the data conversion script 222 to be compatible with the target portable code element 206, 208, 210.

One aspect of the development framework according to the inventive concepts disclosed herein is the ability to work at a very high conceptual level, much higher than is ordinarily available with typical programming languages such as C, C++, Java, or ADA. A scripting environment may allow development in half the time as compared to a full development suite. A scripting environment according the inventive concepts disclosed herein may be textual or graphically based.

Figure 3:
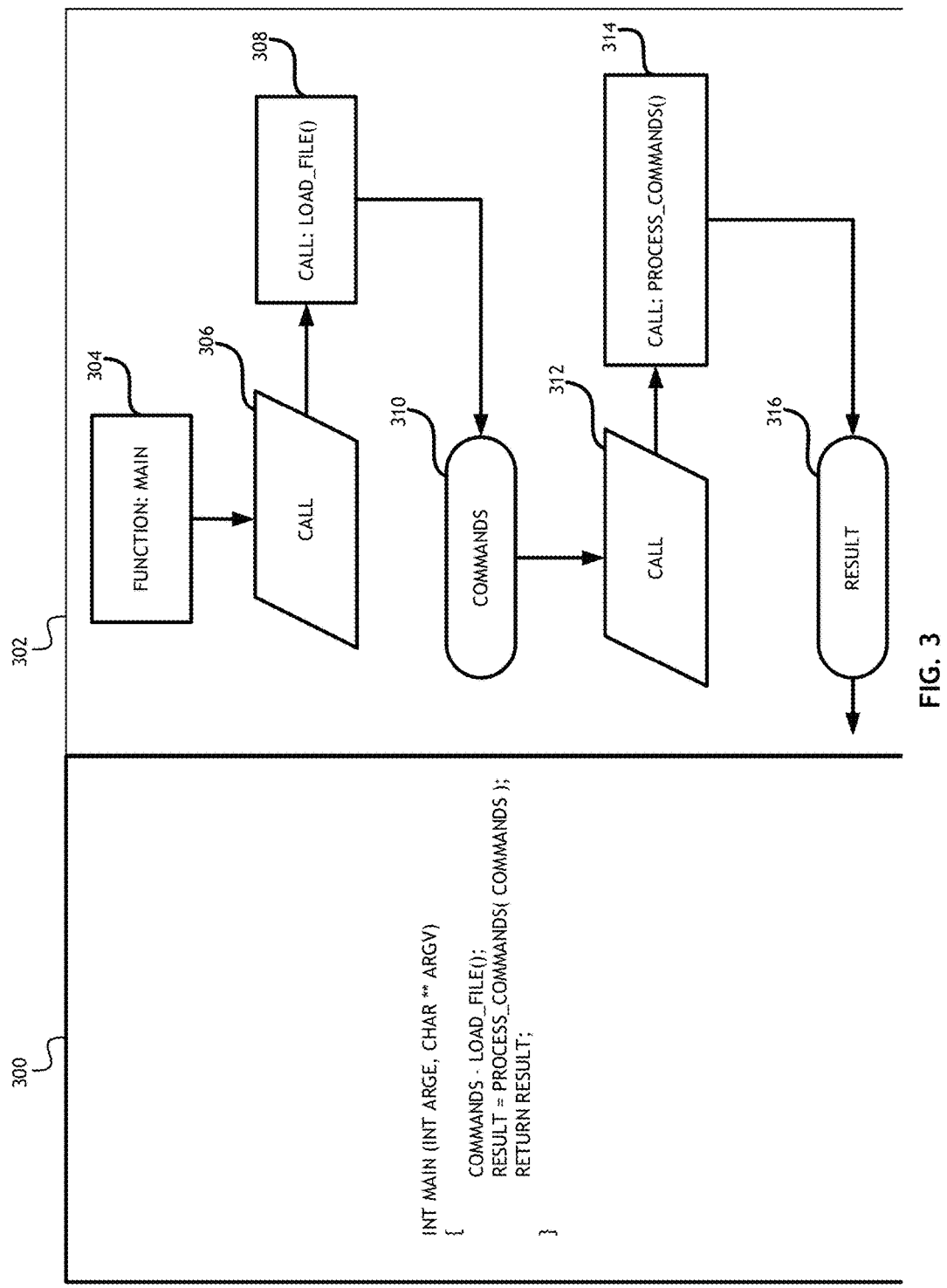
FIG. 3 shows a combined textual, graphical scripting environment.

Referring to FIG. 3, in a combined textual and graphical scripting environment according to embodiments of the inventive concepts disclosed herein, a developer would be supplied with application programming interfaces (APIs) specifically designed for avionics applications such as an API that provides simple mechanisms to draw typical avionics components, such as an aircraft's synoptic layout of the hydraulic system, or an API that provides easy input/output operations such as networking, and special purpose avionics input/output busses such as ARINC 429, AFDX, or MIL STD 1553.

In the embodiment shown in FIG. 3, blocks of functionality 304, 306, 308, 310, 312, 314, 316 are placed on a graphical scripting environment 302 and input/outputs of each block of functionality 304, 306, 308, 310, 312, 314, 316 are connected together. In some embodiments, the graphical development environment would simultaneously display a graphical representation in the graphical scripting environment 302 and equivalent script source code in the textual scripting environment 300. Likewise, as the scripting code is modified in the textual scripting environment 300, the graphical view of the script is simultaneously updated. This process provides two benefits: the first benefit being enhanced precision as both the high-level and low-level consequences of a change are quickly apparent. The second benefit is that the developer is able to obtain a different view or perspective of the source code, which will help to validate the correct operation of the scripting code and will make certain bugs easier to spot in one environment or the other. The contrast of this cross-referencing view will reduce the chances of inadvertently introducing a bug.

The scripting environment would additionally support creating libraries of components that could be reused. The reusable libraries become elements that can be dragged and dropped into the graphical scripting environment 302.

Errors detected in incompatible types, missing connections in the data flow, such as error handling or loop termination errors, and other common programming errors could be detected and indicated on the graphical scripting environment 302. In this way, the graphical environment 302 works to encourage and enforce good programming practices, eliminating a common source of errors, and increase the safety and flight-worthiness of the software.

High-level languages and scripting environments require an underlying program to load and execute the high-level language or script on a target platform. In an embodiment of the inventive concepts disclosed herein, a runtime executable would load and interpret the script at runtime. This embodiment would be used during rapid prototyping and would allow a developer to quickly create and test new functionality. This embodiment also provides a live testing environment for development on the host computer. As the developer updates the script source code, the script if deemed "valid" by the development environment would be executed in real-time on the host against a set of test inputs provided by the developer, allowing the developer to instantly observe the results. For example, when developing some element of display software, such as a hydraulic synoptic, as the developer modifies the script, the valves are rendered and updated. This embodiment improves productivity of the developer by providing instant feedback. The ability to specify test inputs also allows the developer to quickly validate a range of behavior of the component being developed.

In another embodiment of the present invention, the script is compiled on the host platform into an intermediate form, and the intermediate form is loaded and executed by the runtime environment. This embodiment supports deployment of the script to the target device, and removes the time required to parse and interpret the source script, yielding higher startup and runtime performance on the target device.

In at least one embodiment, the runtime executable allows portions of the environment to be written in different scripting languages. Additionally, runtime executable may be configured to interpret "native" calls to standard language libraries such as C, C++, or Ada such that the scripting language could invoked such libraries in the scripting environment.

Figure 4:
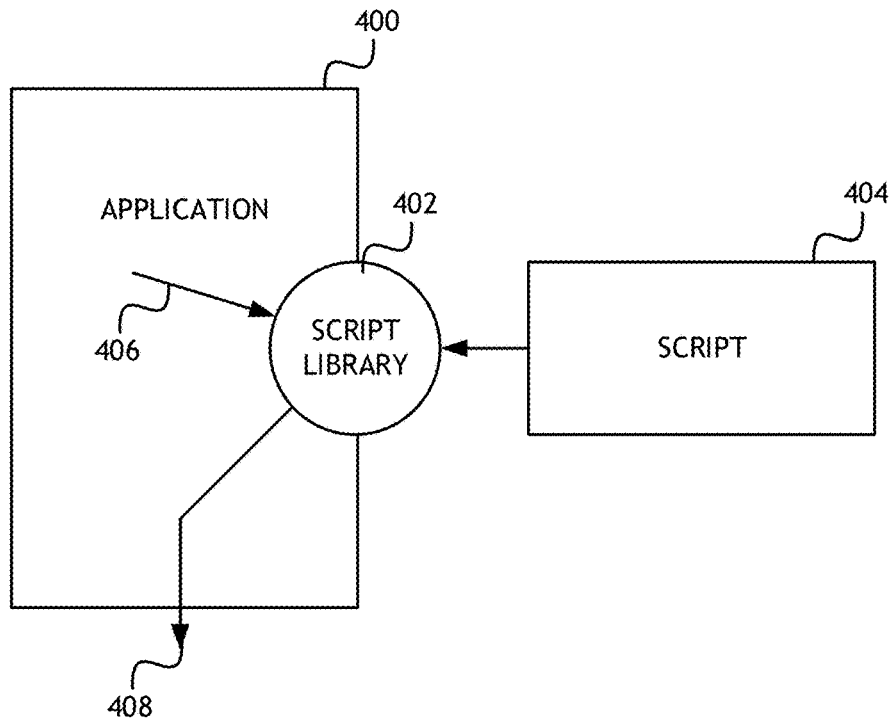
FIG. 4 shows a block diagram of script interpreting system according to one embodiment of the inventive concepts disclosed herein.

Referring to FIG. 4, in a software application 400 with variability, an executing system instantiates a deterministic script engine 402 that allows the developer to implement a desired functionality. Functionality is embodied in scripts 404. In some embodiments, each script 404 is associated with a bounded set of input parameters 406. Each function comprising a script 404 is associated by the scripting engine with certain execution performance metrics such as a worst case execution time. Each function may also be associated with a bounded set of input parameters 406 and output parameters such that all outputs 408 for any permissible input are well defined.

In some embodiments, the executing system defines a set of tiered capability limits to limit the access outside of a script 404 depending on a design assurance level; for example, scripts 404 or data having a high level of criticality may be inaccessible. Further, data sets are classified according to permissible levels of manipulation. In one example, for highly critical data, a deterministic script engine 402 provides each script 404 with a limited set of inputs, and allows each script 404 to respond with a limited set of outputs; no script 404 can modify input parameters 406 beyond the subset provided. In another example, for data having a lower level of criticality, the deterministic script engine 402 maintains a set of permissions for each data element, and allows each script 404 access to a wider range of data, but each script 404 can only change a safe subset.

In the context of the inventive concepts disclosed herein, criticality may be understood to refer to one or a combination of several factors including: the importance of a data set or script to safe operation of an avionics system; the importance of a data set or script to the deterministic operation of an avionics system; and the necessity of a data set or script to the certification of an avionics system.

Likewise, in at least one embodiment of the present invention, a deterministic script engine 402 will limit the functions that can be called to those with boundable temporal performance such that for any set of permitted input parameters 406, the worst case execution time of the function is entirely predicable.

In at least one embodiment, the system calls a deterministic script engine 402 with a defined execution limit, and the deterministic script engine 402 can enforce it. The deterministic script engine 402 has error handling to halt execution or run to completion. The deterministic script engine 402 is reasonably deterministic in its performance with no more jitter in either operating system (OS) calls or cache access than is typical of applications during worst case execution time.

In an avionics environment, software must comply with one or more design assurance levels. For example, execution of design assurance level-C script code requires the interpreter executing the code (in the present case, the deterministic script engine 402) to perform in a deterministic way. Deterministic execution means profiling the execution time of each statement and designing constraints to ensure worst case execution time can be measured. It also means tracking the code executed to allow for statement coverage. In some embodiments, a runtime executable interpreter is configured to profile the execution time of each statement for the range of all possible constraints.

In some embodiments, the deterministic script engine 402 has been analyzed for worst case execution time (T) of any instructions. In one embodiment, the executing system instantiates a virtual machine designed to break down internal functions into simple steps such that even the most complex data structure or manipulation doesn't end up with a very high worst case execution time T for an individual instruction. In at least one embodiment, each instruction may execute via a separate thread. The executing operating system includes an up-time clock for each thread to determine the actual execution time of the script as compared to the predicted execution time for certification purposes.

Starting with a desired Maximum Allowed Script Duration ($SD_M$), the Off-thread Uptime ($UT_{OT}$) is recorded and the executing system enters a loop. Within the loop, the system gets the Current Thread Uptime ($UT_{CT}$), then runs the scripting engine virtual machine for a number of cycles equal to:

$$\frac{SD_M - (UT_{CT} - UT_{OT})}{T}$$

If that value is less than one, it is possible that the Maximum Allowed Script Duration $SD_M$ can be exceeded if any more cycles of the virtual machine are run, therefore the system logs an error. The executing system thereby creates an execution algorithm bounded in time such that if the amount of time available for a function (the amount of time left in the desired Maximum Script duration $SD_M$, after all previously executed functions) is less than the worst case execution time, the script is flagged as possibly non-deterministic.

Figure 5:
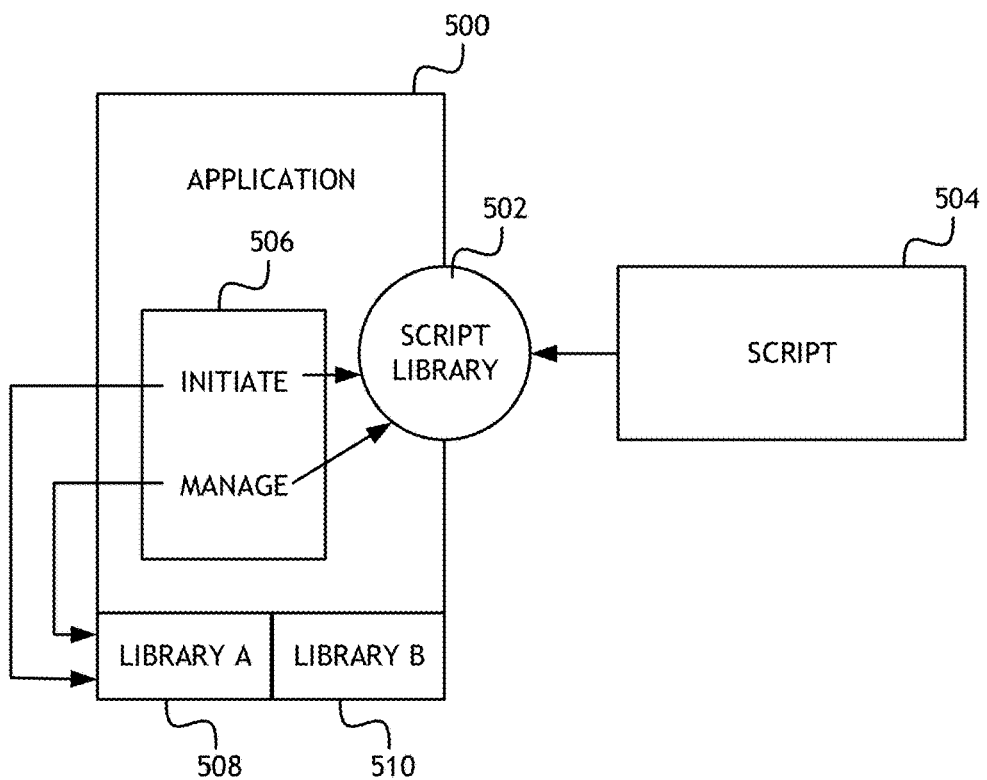
FIG. 5 shows a block diagram of script interpreting system according to another embodiment of the inventive concepts disclosed herein.

Referring to FIG. 5, in some embodiments of the inventive concepts disclosed herein, a software application 500 provides a management framework 506 that manages most of the functionality including initialization of libraries 508, 510, periodic servicing of libraries 508, 510, and periodic calls to scripts 504 through a deterministic script engine 502.

During application startup, the Main( ) function initiates libraries 508, 510, loads scripts 504, and creates a thread that periodically services libraries 508, 510, and calls scripts 504. The deterministic script engine 502 binds a useful subset of the libraries 508, 510 to the deterministic script engine 502. The number of libraries 508, 510 bound and initiated drives parameters necessary for certification.

In some embodiments, each virtual instruction is completed in a static duration such that if the low level processing of certain instructions takes more time, a delay is added to the remaining virtual instructions to normalize the execution time. The script 504 takes the same amount of time every time it is run, reducing risk of non-repeatable behavior. Furthermore, memory is pre-allocated and managed by the deterministic script engine 502 to allow reuse of an off-the-shelf dynamic memory design typical of existing script interpreter software. In one exemplary embodiment, where a script 504 is partitioned into functional elements and each functional element is allocated a segregated memory space, the deterministic script engine 502 could de-allocate or re-allocate memory spaces previously allocated to completed functional elements where the deterministic script engine 502 has determined that memory allocation was insufficient to conform to one or more certification standards associated with the script 504.

To ensure deterministic execution and measure any necessary metrics, the software application 500 and runtime executable partition a script's 504 execution into well-defined execution environments. In some embodiments of the inventive concepts disclosed herein, elements of the script 504 are separated by time, space, and resource partitioning such that one aspect of the script 504 cannot not corrupt another aspect of the script 504. There must be a clear boundary between such partitions such that the development environment ensures no memory is shared between two partitions, no resources (file descriptors, sockets, semaphores, etc.) are directly shared or allocated between two partitions, the scheduling or execution order/timing is known for each partition and one partition is unable to interfere with any others timing, and the binary interface between two partitions is compatible with other languages (i.e., a standard application binary interface or calling convention is used between script partitions). Resources which cannot be directly referenced and which are managed through calls to the libraries 508, 510 are obligated to be managed in an appropriate partitioning manner by the libraries 508, 510.

The script partitioning boundary is used to show that the script partitions are truly isolated from each other, and provides a clean way to interface the scripting environment with other languages such as C, C++, Java, ADA, or even other scripting environments using a different scripting language. Further, the script partitioning boundary provides a mechanism to analyze the script 504, and provides a controlled mechanisms to support fault isolation.

The inputs and outputs of the well-known script partitioning boundary is also monitored and validated at runtime to further ensure correct operation of the script 504.

With the script partitioning boundary in place, script 504 elements are effectively segregated. In some embodiments of the inventive concepts disclosed herein, a developer gradually phases in compiled source code in place of individual segregated script 504 elements. For example, if an aspect of the script 504 is safety critical or requires high performance, the developer may choose to re-develop the script in a traditional language or runtime, such as C, C++, or ADA. In those cases, development techniques are used to develop and deploy the flight critical software while still utilizing the scripting environment for less critical aspects of the software. This would allow the developer the option for rapid development, but also allow targeted redevelopment later in the development cycle to support safety or other objectives.

Additionally, instead of the scripting environment converting the script to an intermediate binary format, in at least one embodiment the scripting environment generates source code in a traditional language, such as C, C++ or ADA from the script code. Converting the script code to a high level language allows for rapid prototyping and also provides a starting point to further refine and optimize the source code. Depending on the sophistication of the code generation, the code could be a stepping stone for the development process wherein the developers modify the generated code and review it manually, or a qualified development tool capable of directly generating source code that is guaranteed to be equivalent to the script.

In some embodiments of the inventive concepts disclosed herein, the runtime executable environment is certified to the highest certification level required for the system, and forms a reliable foundation for executing script partitions, and enforcing the separation of script partitions. Further, the runtime executable provides a certified mechanism to monitor the operation of script partitions and acts as a gatekeeper between script partitions to ensure that inputs and outputs are within known, safe limits. In this embodiment, certification requires certifying the individual script partitions rather than the entire application as a whole.

In cases where the highest standards must be followed, such as safety critical software, the script partition may in fact be traditionally compiled source code, and would thus follow standard techniques for certification. In cases where the scripting environment interfaces with a target device, the aspect of the runtime executable instantiated within the script partition boundary is certified to show that it can execute the scripting language (or intermediate form) in a deterministic, predictable manner. The certification process then focuses on ensuring that the modules in the scripting language are correct, gradually building to show that the script overall is correct.

Script modules developed using embodiments of the present invention to work with particular avionics hardware are pre-certified. Developers attempting to further develop applications for the hardware may only need to certify the business logic within their scripting codebase. Such developer may reuse the entire stack of software a high-level conceptual API.

In some embodiments of the inventive concepts disclosed herein, encryption is used to secure the script libraries and validate such libraries for use with particular hardware. Script libraries are thereby matched against the hardware to ensure compatibility and correct operation. Additionally, such encryption mechanisms may be used to enforce software licensing by ensuring only purchased functionality is operational and deactivate code as necessary.

Figure 6:
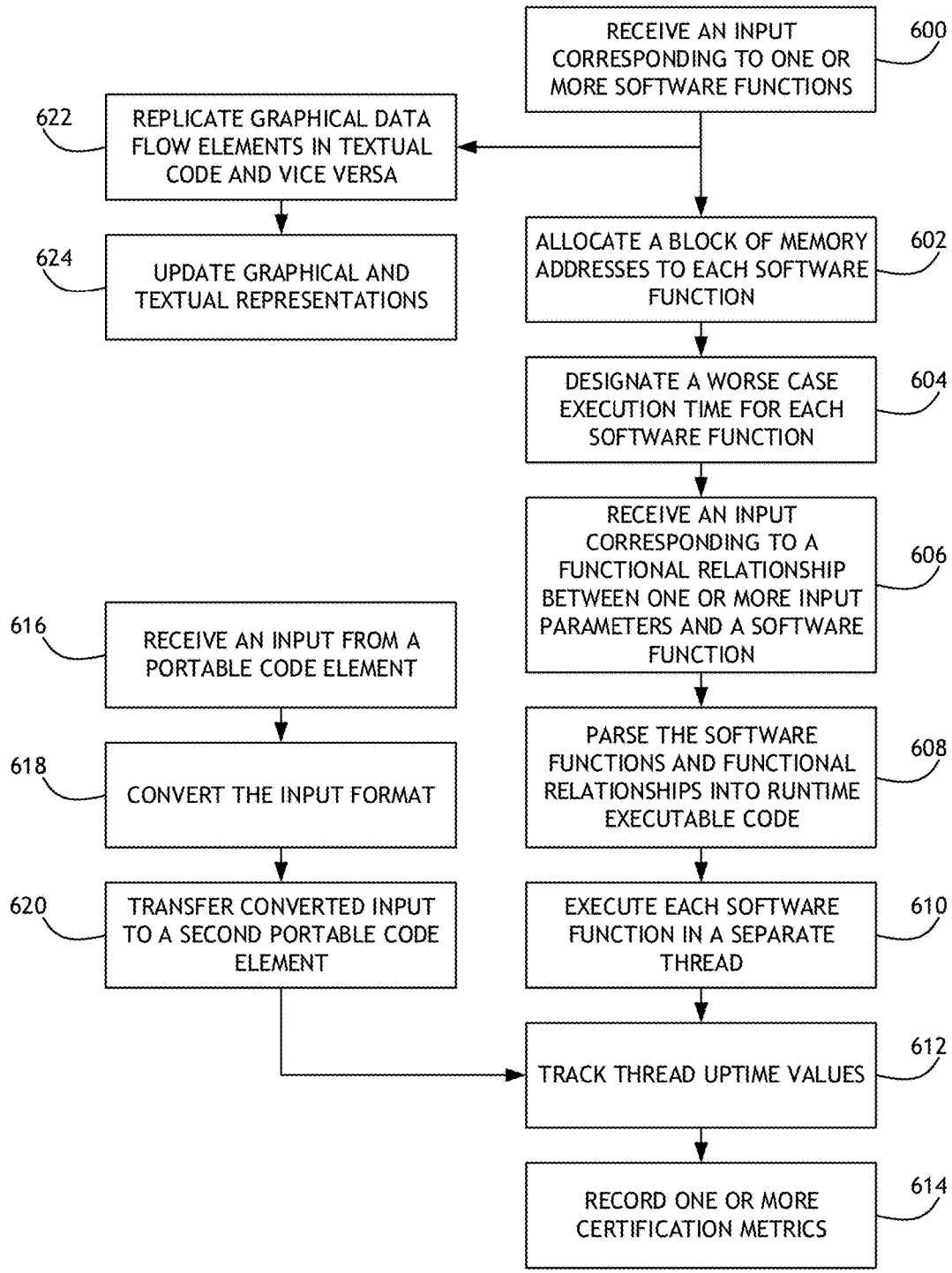
FIG. 6 shows a flowchart of a method according to one embodiment of the inventive concepts disclosed herein.

Referring to FIG. 6, a flowchart of a method according to one embodiment of the inventive concepts disclosed herein is shown. An avionics software development system executing processor executable code receives 600 input corresponding to one or more software functions. Each software function is allocated 602 a block of memory addresses and designated 604 a worst case execution time. The avionics software development system then receives 606 input corresponding to functional relationships between inputs and the one or more software functions. The software functions and functional relationships are then parsed 608 into runtime executable code. Each software function is then executed 610 in a separate thread while the thread uptime values are tracked 612. During execution, metrics relevant to avionics certification are recorded 614. In at least one embodiment, the avionics software development system receives 616 input from one or more portable code elements, converts 618 the input into a different format suitable for use by the runtime software functions, and transfers 620 the converted input to a second portable code element. In at least one embodiment, the avionics software development system interpolates and represents 622 textual software commands into graphical form and vice versa, and updates 624 textual and graphical representations in real time as they are manipulated.

It is believed that the inventive concepts disclosed herein and many of their attendant advantages will be understood by the foregoing description of embodiments of the inventive concepts disclosed herein, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An avionics software development apparatus comprising:
   at least one processor;
   memory connected to the at least one processor;
   a data storage element connected to the processor and configured for persistent data storage, the data storage element including a plurality of libraries defining a plurality of software functions applicable to avionics hardware; and
   computer executable program code stored in the memory, configured to instruct the at least one processor to:
   receive one or more input parameters corresponding to one or more software functions of the plurality of software functions, wherein the one or more input parameters correspond to the one or more software functions based on one or more metrics relevant to certification of the one or more software functions for use in an avionics application;
   allocate one or more blocks of addresses in the memory, wherein each of the one or more blocks of addresses is associated with one of the one or more software functions;
   designate a worst case execution time for each of the one or more software functions;
   receive input corresponding to one or more functional relationships between the one or more input parameters and the one or more software functions;
   parse the one or more software functions and one or more functional relationships into runtime executable code;
   define a static duration for each software function;
   execute each of the one or more software functions during the defined static duration in a separate thread to generate one or more output parameters by modifying at least a portion of the one or more input parameters, and adding a delay;
track a current thread uptime value for each thread;
run a script engine virtual machine for a number of cycles equal to a desired maximum allowed script duration minus the difference between the current thread uptime and an off-thread uptime, divided by the worst case execution time;
determine that the number of cycles is less than one; and
flag the script thread as non-deterministic.

2. The avionics software development apparatus of claim 1, further comprising an avionics specific hardware element connected to the at least one processor, wherein the computer executable program code is further configured to instruct the at least one processor to apply the runtime executable code to the avionics specific hardware element.

3. The avionics software development apparatus of claim 1, wherein the computer executable program code is further configured to instruct the at least one processor to:
receive a first input from a first portable code element;
execute a data conversion script to convert the first input from a first format to a second format; and
transfer the first input to a data bus.

4. The avionics software development apparatus of claim 3, wherein the computer executable program code is further configured to instruct the at least one processor to:
receive the first input from the data bus; and
pass-through the first input to a second portable code.

5. The avionics software development apparatus of claim 1, wherein the computer executable program code is further configured to instruct the at least one processor to:
receive a textual modification to a displayed textual script of a source code for a software function;
convert the textual modification to a graphical data flow element for a displayed graphical data flow; and
simultaneously modify the displayed textual script of a source code for the software function to include the textual modification and modify the displayed graphical data flow of the software function to include the graphical data flow element,
wherein the graphical data flow element is saved as a reusable element within a library of elements of the plurality of libraries for the displayed graphical data flow.

6. The avionics software development apparatus of claim 1, wherein the computer executable program code is further configured to instruct the at least one processor to:
receive a graphical modification to a graphical data flow element in a displayed graphical data flow of a software function;
convert the graphical modification to a textual modification to a textual script for the software function; and
simultaneously modify the graphical data flow element in the displayed graphical data flow to include the graphical modification and modify the displayed textual script of the software function to include the textual modification,
wherein the graphical data flow element modified to include the graphical modification is saved as a reusable element within a library of elements of the plurality of libraries for the displayed graphical data flow.

7. An avionics software development environment comprising:
a processor, configured to execute:
a script editing element;
a script engine for interpreting a script to a runtime executable format;
a resource allocation processing element;
a data storage element comprising a set of input parameters corresponding to one or more certification metrics for an avionics software package,
wherein:
the script engine parses each function defined by the script into separately executable elements;
the resource allocation processing element allocates separate resources to each separately executable element;
the script engine defines a static duration for each separately executable element;
the script engine executes each separately executable element in a separate execution thread, wherein the script engine utilizes one or more input parameters of the set of input parameters from the data storage element to generate one or more boundable execution metrics for each of the separately executable elements and a current thread uptime value for each execution thread from at least a portion of the one or more input parameters, and adding a delay, wherein the generating of the one or more boundable execution metrics is monitored and validated at runtime to ensure correct operation of the script;
the resource allocation processing element generates one or more boundable execution metrics for the script based on the one or more boundable execution metrics of the corresponding separately executable elements; and
a script engine virtual machine runs a number of cycles equal to a desired maximum allowed script duration minus the difference between the current thread uptime and an off-thread uptime, divided by a worst case execution time;
determines that the number of cycles is less than one; and
flags the script as non-deterministic.

8. The avionics software development environment of claim 7, wherein the one or more boundable execution metrics for each of the separately executable elements comprises the worst case execution time.

9. The avionics software development environment of claim 7, wherein the processor is further configured to execute:
a graphical data flow element; and
a script-to-function processing element,
wherein the script-to-function processing element is configured to:
receive a source code input in the script editing element, convert the source code input in the script editing element input into an input in the graphical data flow element, and simultaneously modify the script editing element and the graphical data flow element; and
receive an input in the graphical data flow element, convert the input in the graphical data flow element into a source code input in the script editing element, and simultaneously modify the graphical data flow element and the script editing element,
wherein the input in the graphical data flow element is saved in the data storage element as a reusable input for the graphical data flow element.

10. The avionics software development environment of claim 7, further comprising:

an avionics hardware simulation processor, wherein the avionics hardware simulation processor is configured to execute an avionics hardware simulation element, wherein the script engine is configured to deliver an output to the avionics hardware simulation processor, wherein the avionics hardware simulation processor is configured to run a simulation with the delivered output in the avionics hardware simulation element.

11. The avionics software development environment of claim 10, wherein the avionics hardware simulation processor is further configured to apply one or more input parameters of the set of input parameters from the data storage element to determine if an avionics hardware device complies with one or more certification metrics.

12. The avionics software development environment of claim 10, wherein the resource allocation processing element allocates separate, distinct execution schedules for each separately executable element.

13. A computer apparatus comprising:
at least one processor configured to execute a script engine;
a memory connected to the at least one processor; and
computer executable program code configured to instruct the at least one processor to:
receive a script;
associate the script with a bounded set of input parameters;
partition the script into separate executable functions;
instantiate separate executable environments for each executable function within a separate execution thread;
define a static duration for each executable function;
iteratively execute each executable function with the bounded set of input parameters, and adding a delay, to generate a bounded set of output parameters by modifying at least a portion of the bounded set of input parameters, wherein the iterative executing of each executable function is monitored and validated at runtime to ensure correct operation of the script;
record an execution time of each executable function based on a current thread uptime of the corresponding execution thread; and
determine a worst case execution time for the script based on the execution times of the executable functions;
run a script engine virtual machine for a number of cycles equal to a desired maximum allowed script duration minus the difference between the current thread uptime and an off-thread uptime, divided by the worst case execution time;
determine that the number of cycles is less than one; and
flag the script as non-deterministic.

14. The computer apparatus of claim 13, wherein the computer executable program code is further configured to instruct the at least one processor to record, in the memory, any failure states of the executable functions.

15. The computer apparatus of claim 13, wherein the computer executable program code is further configured to instruct the at least one processor to convert one of the executable functions to machine code and maintain remaining executable functions in script for interpretation by the script engine.

16. The computer apparatus of claim 13, wherein the computer executable program code is further configured to instruct the at least one processor to convert one of the executable functions to a high-level programming language and maintain remaining executable functions in script for interpretation by the script engine.

17. The computer apparatus of claim 13, wherein the computer executable program code is further configured to instruct the at least one processor to:
compile the script into a library; and
apply an encryption to the library.

18. The computer apparatus of claim 17, wherein the encryption is configured to validate the library for use with specific avionics hardware.

19. The computer apparatus of claim 13, wherein the bounded set of input parameters are configured to ensure an avionics system operates deterministically.

* * * * *